UNITED STATES PATENT OFFICE.

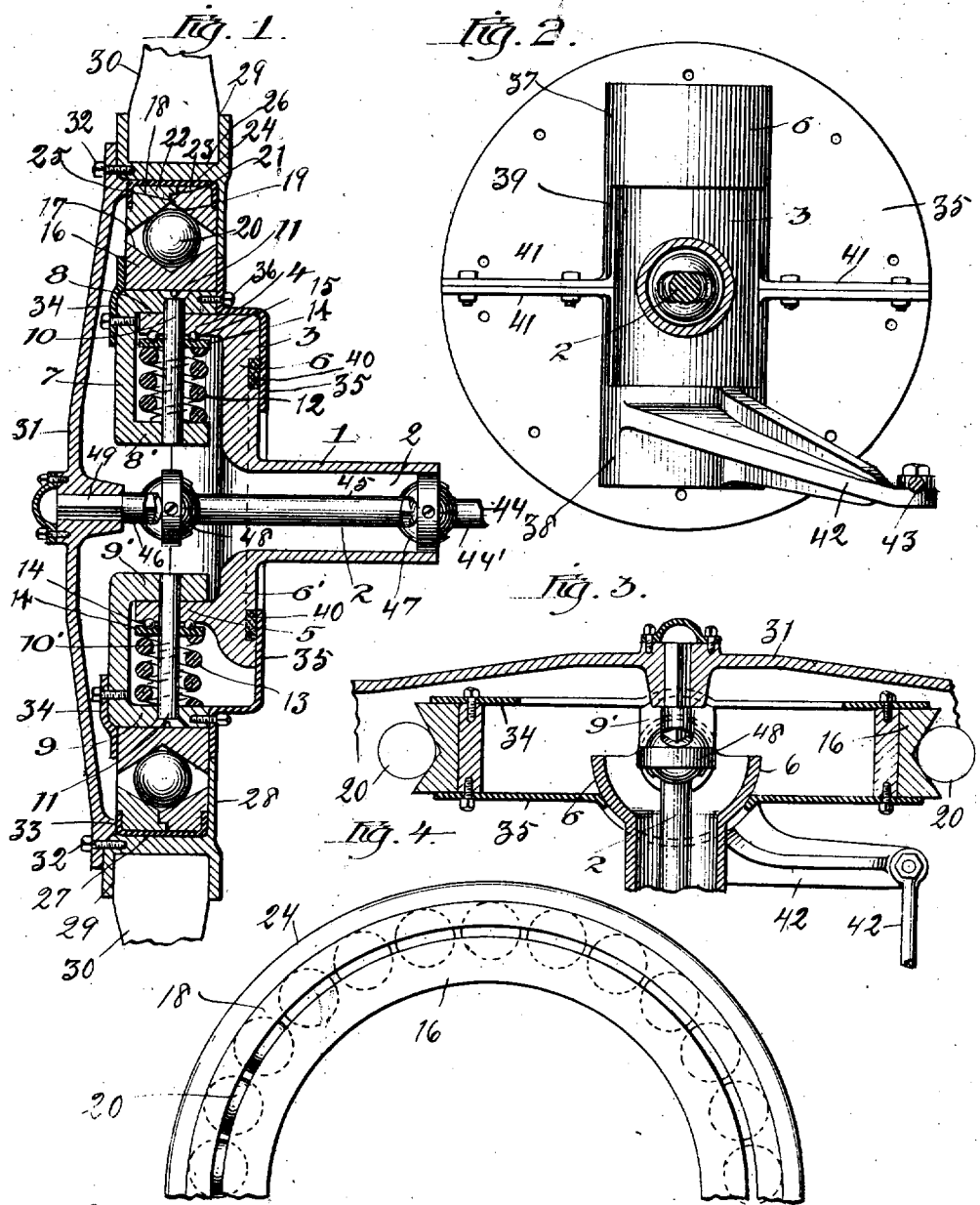

MARTIN L. WILLIAMS, OF SOUTH BEND, INDIANA.

VEHICLE-WHEEL.

No. 903,256.

Specification of Letters Patent.

Patented Nov. 10, 1908.

Application filed February 12, 1906. Serial No. 300,556.

*To all whom it may concern:*

Be it known that I, MARTIN L. WILLIAMS, a citizen of the United States, residing at South Bend, in the county of St. Joseph and State of Indiana, have invented certain new and useful Improvements in Vehicle-Wheels, of which the following is a specification.

This invention relates to improvements in vehicle wheels and refers more specifically to an improved vehicle wheel equipped with springs interposed between the axle and parts of the wheel to which the weight carried by the axle is transmitted.

Among the salient objects of the invention are to provide a construction in which the weight carried by the axle of the vehicle is transmitted to the supporting wheel through the springs; to provide a vehicle wheel the parts of which are so constructed and arranged that the wheel may oscillate about a vertical axis without modifying the action of the supporting springs or other coöperative parts; to provide a construction which may be utilized as a traction and starting wheel without disturbing the coöperative relations of the parts; to provide a construction in which the springs, bearings and driving mechanism are all effectively housed and selfcontained; to so construct and arrange the parts as to afford ready access to the working parts of the wheel and permit this to be done without disturbing the adjustments of the various parts, and in general to provide a simple, efficient and generally improved construction of the character referred to.

The invention consists in the matters hereinafter described, and more particularly pointed out in the appended claims.

In the drawing—Figure 1 is a vertical and axial sectional view of the hub portion of a wheel and connected end of the vehicle axle, embodying the invention; it being understood that the rim and outer parts of the wheel may be of any usual or preferred construction; Fig. 2 is a view taken on line 2—2 of Fig. 1 and looking in the direction of the arrows; the outer portions of the figure being omitted; Fig. 3 is an axial section of the central portion of the hub taken in a plane at right angles to the plane of section of Fig. 1; Fig. 4 is a view in elevation of one-half of one of the improved roller bearings forming one feature of the present invention, shown as removed from its seat.

Referring to the drawing, 1 designates the end portion of a vehicle axle which is hollow or axially bored, as indicated at 2, and terminates in a yoke-like enlargement 3 having upper and lower supporting ears 4 and 5, respectively. The inner vertical faces, 6 and 6', of the yoke extensions are cylindric, as best seen in Fig. 3, and concentric with the axis of oscillation of the wheel, as will hereinafter appear.

7 designates as a whole a couple-yoke which is pivotally mounted upon the stationary yoke 3 upon the end of the axle. To this end the yoke 7 is provided with two vertically alined pivot ears, designated 8 and 8', at its upper side and with a corresponding pair of pivot ears 9 and 9' at its lower side; all four of these ears being in vertical register with each other, and in register with the ears 4 and 5 of the stationary yoke. Through the upper pair of ears 8 and 8' and the interposed ear 4 is inserted a pivot bolt 10, and likewise through the lower sets of ears is inserted a similar pivot bolt 10'; each of these pivot bolts being provided at its radially outer end with a head 11 which is countersunk so as to lie flush with the exterior surface of the corresponding yoke ear.

The yoke ears 8, 8' and 9, 9' are spaced apart a considerable distance, and between the under sides of the yoke ears 4 and 5 of the stationary yoke and the upper sides of the lower ears 8' and 9 of the couple-yoke, are interposed coiled expansion springs 12 and 13, respectively, which are of sufficient strength to sustain the vehicle load which comes upon the wheel.

In order to reduce the frictional resistance of oscillatory movement of the wheel about the pivot bolts 10 and 10', bearing plates 14 are interposed between the upper ends of these springs and the overlying ears 4 and 5 and between each bearing plate and ear is formed a race way in which is arranged a set of anti friction balls, as 15; these race ways being concentric with the pivot bolts.

The exterior of the couple-yoke is circular, and cylindric in the present instance, and forms a seat upon which is mounted an anti friction ball bearing mechanism, which ball-bearing mechanism has been made the subject of a division application. This ball bearing mechanism comprises an inner race ring 16 seated directly upon the exterior of the couple-yoke and provided in its outer periphery with a V-shaped ball groove 17, a somewhat similar outer race ring, designated as a whole 18, arranged concentric with the inner race ring and provided in its inner face with a ball race 19 and a set of anti friction balls 20 interposed between the race rings. The outer race ring is of two-part construction, being divided and separable at a joint 21 which bisects the race groove; this expedient being adopted in order to permit of the assembling of the bearing. The two parts, designated 22 and 23, of the divided ring are rigidly united and held in fixed relation to each other by means of a channel-shaped union ring 24 applied to the outer periphery of the ring and having its lateral edges embracing the lateral sides of the ring members, as shown clearly in the drawing. This channel ring is formed of metal which can be bent or formed into channel shape upon the exterior of the ring after the bearing members have been properly assembled, such for example as mild steel. The edges of the union ring or band are crimped or formed over so as to embrace the sides of the divided ring and make of the latter to all practical intents a one-piece structure. In order to further insure against movement of one member 22 relatively to the other 23, the joint of separation 21 is shown as so formed as to provide interfitting shoulders and recesses; the line of separation being zigzagged in the present instance, as indicated at 25. The sides of the ball groove, both in the outer and inner bearing rings, are inclined equally to the axis of the bearing rings so that the race way formed between the two rings provides four points of bearing for each ball element 19, which points of bearing are so located as to best resist end thrusts or weight brought thereon in a direction parallel with the axis of the wheel while at the same time transmitting the carried weight from the vehicle axle to the wheel.

The union ring 24 is seated in a suitable seat formed upon the interior of a spoke-ring casting or forging, designated as a whole 26; this member being to this end provided with an internal cylindric seat 27 and a right-angled or radial flange 28 extending radially inward at the inside of the wheel and slightly overlapping the corresponding side of the relatively fixed bearing ring 16. Radial spoke sockets 29 are formed at suitable intervals in the outer side of the spoke-ring, within which are seated spokes 30 which, of course, carry at their outer ends any suitable wheel rim and tire.

A circular end plate 31 is applied to the outer side of the spoke-ring member in such manner as to completely inclose the outer side or end of the hub, the periphery of said plate being shown as conveniently bolted to the spoke-ring member by a series of tap bolts 32. An annular projection 33 upon the inside of the end plate 31 impinges against the proximate side of the outer ring 18 and confines the latter properly within its seat. The inner bearing ring member 16 is confined upon its seat, as to its outer side, by means of a flat confining ring 34 bolted to the couple-yoke, as shown, and overlapping the side of the ring, and as to its opposite side said ring is confined by a closure plate 35 the peripheral portion of which is bolted to the couple-yoke, as indicated at 36, and similarly overlaps the bearing ring. As hereinbefore stated, the inner vertical faces 6 and 6' of the yoke extensions on the axle are cylindric, and the closure plate 35 is correspondingly shaped, as indicated at 37 and 38 (see Fig. 2) to fit over these yoke members. Inasmuch as the axle yoke has a vertical movement relatively to the wheel and closure plate, the latter is slotted or provided with a suitable central opening 39 to provide for the up and down movement of the axle. A packing ring 40 of felt or other suitable material is desirably interposed between the meeting faces of the yoke members and closure plate. The closure plate is of two-part construction, being shown as divided along its horizontal center, and the meeting edges thereof united by means of outturned flanges 41 through which are inserted suitable bolts. The lower closure plate member carries a steering arm 42, shown as formed integrally therewith and arranged to extend laterally and obliquely downwardly from the vertical center of the hub, as seen clearly in Figs. 2 and 3; the outer end of this steering arm being shown as connected with a steering rod 43.

The vehicle wheel shown in the present instance is a traction wheel and is driven through the hollow axle. To this end a flexible axle shaft, designated as a whole 44, is shown as extending outwardly through the hollow axle, through the central opening of the couple-yoke and operatively connected with the center of the end plate 31. The axle shaft comprises three sections, designated 44, 45 and 46, respectively, connected with each other by two ball or universal joints 47 and 48. The shaft member 44, it will be understood, is suitably journaled in the vehicle axle so that itself and the ball joint 48 are incapable of bodily movement, although, of course, free to rotate. The ball joint 48 is located as accurately as may be in alinement with the oscillatory or pivotal axis of the wheel, i. e. in alinement with the pivot bolts 10 and 10', while the section 46 is operatively connected with the center of the end plate 31 by means of a square or non-circular shank 49 engaging a corresponding aperture in the plate and free to slide endwise thereon. The mechanism thus constructed obviously affords free movement of the axle relatively to the wheel under the compressing and expanding action of the springs 12 without in any wise disturbing the driving mechanism of the wheel, and inasmuch as the ball joint 48 is located in alinement with the axis of oscillation of the wheel it will be obvious that steering movements of the wheel do not in any wise disturb the driving mechanism. In this connection it will be noted that the width of the opening 39 in the closure plate 35 is ample to permit the necessary oscillatory movement of the wheel without bringing the plate into encounter with the axle.

It will be understood from the foregoing description that a wheel embodying my invention accomplishes the several objects hereinbefore stated, and provides an extremely simple, durable structure of the character described.

It will be further understood that certain features of the improvement are not necessarily combined with other features, as for example that feature of the invention which resides in mounting the wheel upon the axle through the medium of stationary and couple-yokes and interposed expansion springs, as applicable to a wheel incapable of oscillatory movement upon the axle. So also the driving mechanism may be dispensed with where the wheel is not a traction wheel.

I claim as my invention:

1. In combination with a vehicle axle having a terminal yoke, a vehicle hub having an end closure plate and couple yoke movably connected with the axle yoke, coiled springs interposed between the interfitting parts of the axle yoke and couple yoke, an axle secured to said end closure plate and extending between said coiled springs and having driving connections independently of the latter.

2. In combination with a vehicle axle having a terminal yoke provided with vertically superposed spaced apart ears, a hub comprising a couple-yoke having vertically superposed spaced apart ears adapted to register with the ears of the axle yoke, one or more pivot bolts extending through said overlapping ears of the axle and couple-yokes and pivotally uniting the same, one or more coiled expansion springs interposed between said ears and through which the weight on the vehicle axle is transmitted to the couple yoke, a wheel journaled to rotate upon the exterior of the couple-yoke, an end closure plate secured to said wheel, and an axle shaft extending between said interconnecting yokes and having driving connections with said end closure plate independently of said springs.

3. In combination with a vehicle axle having a terminal yoke provided with vertically superposed and spaced apart ears, a vehicle hub comprising a couple-yoke having vertically superposed and spaced apart ears adapted to register with the ears of the axle yoke, one or more pivot bolts extending through said overlapping ears of the axle and couple-yokes and pivotally uniting the same, one or more coiled expansion springs interposed between said ears and through which the weight on the vehicle axle is transmitted to the couple-yoke, a wheel journaled to rotate upon the exterior of the couple-yoke, and driving connections extending through the axle and couple-yokes and operatively connected with the wheel journaled upon the latter yoke.

4. In combination with a vehicle axle having a terminal yoke provided with vertically superposed and spaced apart ears, a vertical hub comprising a couple-yoke having vertically superposed and spaced apart ears adapted to register with the ears of the axle yoke, one or move pivot bolts extending through said overlapping ears of the axle and couple yokes and pivotally uniting the same, one or more coiled expansion springs interposed between said ears and through which the weight on the vehicle axle is transmitted to the couple-yoke, a wheel journaled to rotate upon the exterior of the couple-yoke, and driving connections extending through the axle and couple yokes and operatively connected with the wheel journaled upon the latter yoke, said driving connections comprising a sectional shaft provided with a universal joint located approximately in alinement with the axis of oscillation of the wheel and a second joint located within the axle and inside of said first mentioned joint.

5. In combination, a vehicle axle having a terminal yoke comprising vertically upward and vertically downward extending arms each provided with vertically superposed and spaced apart ears, the exterior surfaces of said yoke-arms being vertical and cylindric, a vehicle hub connected with said yoke comprising a couple-yoke having vertically superposed and spaced apart ears adapted to register with the ears of the axle-yoke and couple-yoke and pivotally uniting same, one or more coiled expansion springs interposed between the ears of the couple-yoke and those of the axle-yoke, a wheel journaled to rotate upon the exterior of the couple-yoke, and a closure plate mounted upon the inner side of said wheel and surrounding and partially inclosing said axle yoke, that part of said plate contiguous to the cylindric surfaces of said yoke arms being formed correspondingly cylindric, and provided with an aperture through which the axle extends, substantially as described.

6. In combination, a vehicle axle having a terminal yoke comprising vertically upward and vertically downward extending arms each provided with vertically superposed and spaced apart ears, the exterior surfaces of said yoke-arms being vertical and cylindric, a vehicle hut connected with said yoke comprising a couple-yoke having vertically superposed and spaced apart ears adapted to register with the ears of the axle-yoke and couple-yoke and pivotally uniting the same, one or more coiled expansion springs interposed between the ears of the couple-yoke and those of the axle-yoke, a wheel journaled to rotate upon the exterior of the couple-yoke, and a closure plate mounted upon the inner side of said wheel and surrounding and partially inclosing said axle-yoke, that part of said plate contiguous to the cylindric surfaces of said yoke arms being formed correspondingly cylindric, and provided with an aperture through which the axle extends, and a packing interposed between said closure plate and the yoke and surrounding the aperture through the closure plate, substantially as described.

MARTIN L. WILLIAMS.

Witnesses:
FRANK L. BELKNAP,
EMILIE ROSE.